US012282039B2

(12) United States Patent
Toole et al.

(10) Patent No.: US 12,282,039 B2
(45) Date of Patent: Apr. 22, 2025

(54) ARTICULATING MOORED PROFILER SYSTEM

(71) Applicant: Woods Hole Oceanographic Institution, Woods Hole, MA (US)

(72) Inventors: John M. Toole, Woods Hole, MA (US); Kenneth W. Doherty, Woods Hole, MA (US); Jeffrey K. O'Brien, Woods Hole, MA (US); Frederik T. Thwaites, Woods Hole, MA (US)

(73) Assignee: WOODS HOLE OCEANOGRAPHIC INSTITUTION, Woods Hole, MA (US)

( * ) Notice: Subject to any disclaimer, the term of this patent is extended or adjusted under 35 U.S.C. 154(b) by 979 days.

(21) Appl. No.: 16/840,526

(22) Filed: Apr. 6, 2020

(65) Prior Publication Data

US 2020/0319226 A1    Oct. 8, 2020

Related U.S. Application Data

(63) Continuation-in-part of application No. 15/762,395, filed as application No. PCT/US2016/055159 on Oct. 3, 2016, now Pat. No. 10,611,437.
(Continued)

(51) Int. Cl.
*G01C 13/00* (2006.01)
*B63B 35/00* (2020.01)
(Continued)

(52) U.S. Cl.
CPC ............... *G01P 5/24* (2013.01); *B63B 35/00* (2013.01); *G01C 13/00* (2013.01)

(58) Field of Classification Search
CPC .... G01P 13/02; G01P 5/02; G01P 5/06; G01P 5/00; G01P 5/01; G01P 5/07; G01P 1/122;
(Continued)

(56) References Cited

U.S. PATENT DOCUMENTS 4,191,049 A * 3/1980 Bowditch ............... B63B 22/20
 73/170.11
9,573,659 B2 * 2/2017 Liu ........................ B63B 21/50
(Continued)

FOREIGN PATENT DOCUMENTS

RU    2653614 C1 * 5/2018
RU    2734644 C1 * 10/2020

*Primary Examiner* — Andre J Allen
(74) *Attorney, Agent, or Firm* — Kean Miller, LLP; Robert Devin Ricci; Lauren J. Rucinski (57) ABSTRACT

The present invention relates to profiler systems and methods for observing and sensing aspects of a body of water at a plurality of depths. A water profiler is disclosed comprising, generally, a vessel body connected to an external mooring mechanism via an attachment mechanism, a drive mechanism for maneuvering the vessel body longitudinally about the mooring mechanism; an articulating mechanism; and a sensor array capable of measuring a parameter for study wherein the vessel body is capable of articulating about the mooring mechanism. In alternate embodiments, the articulation allows the vessel body to be placed in relation with the three dimensional current such that at least one sensor is positioned into the current so as to sample or measure undisturbed water. In alternate embodiments, hydrofoils or wings are mounted to the vessel body that can be manipulated to harness the current force and maneuver the vessel body.

19 Claims, 6 Drawing Sheets

Related U.S. Application Data (60) Provisional application No. 62/236,288, filed on Oct. 2, 2015.

(51) Int. Cl.
    *G01P 5/00*      (2006.01)
    *G01P 5/24*      (2006.01)

(58) Field of Classification Search
CPC .... G01P 5/04; G01P 5/08; G01P 5/086; G01P 5/18; G01P 7/00; G01P 5/12; G01P 5/242; G01P 1/07; G01P 1/127; G01P 13/00; G01P 13/0006; G01P 13/0013; G01P 13/002; G01P 13/0073; G01P 15/00; G01P 15/032; G01P 15/08; G01P 15/11; G01P 15/125; G01P 15/13; G01P 2015/0828; G01P 5/006; G01P 5/14; G01P 5/22; G01P 5/245; G01P 5/247; G01P 15/04; G01P 5/10; G01P 5/241; G01P 5/244; B63B 2211/02; B63B 22/18; B63B 22/003; B63B 22/24; B63B 22/20; B63B 2022/006; B63B 21/66; B63B 22/04; B63B 59/04; B63B 2021/005; B63B 22/00; B63B 22/08; B63B 22/12; B63B 22/16; B63B 39/14; B63B 21/20; B63B 2027/165; B63B 21/56; B63B 22/02; B63B 22/06; B63B 22/14; B63B 2207/02; B63B 2209/02; B63B 2209/14; B63B 2211/00; B63B 2211/06; B63B 3/04; B63B 35/00; B63B 49/00; B63B 51/04; B63B 7/00; B63B 2035/008; B63B 21/29; B63B 22/22; B63B 2201/16; B63B 27/36; B63B 35/40; B63B 35/42; B63B 39/12; B63B 51/02; B63B 71/10; B63B 79/15; B63B 79/40
USPC .......................................... 73/170.29–170.34
See application file for complete search history.

(56) References Cited

U.S. PATENT DOCUMENTS

| | | | |
|---|---|---|---|
| 10,041,466 B2* | 8/2018 | Hine | F03B 13/20 |
| 10,611,437 B2* | 4/2020 | Toole | G01C 13/004 |
| 2010/0332041 A1* | 12/2010 | Hunt | B63B 21/50 |
| | | | 290/43 |
| 2021/0088687 A1* | 3/2021 | Mancini | G01V 1/3852 |
| 2021/0173110 A1* | 6/2021 | Mancini | B63G 8/001 |

* cited by examiner

ARTICULATING MOORED PROFILER SYSTEM

CROSS REFERENCE TO RELATED APPLICATIONS

This Application claims priority to U.S. application Ser. No. 15/762,395 filed on Mar. 22, 2018, a national phase filing under 35 USC § 371 of international application PCT/US16/55159 filed on Oct. 3, 2016 and U.S. Provisional Application 62/236,288 entitled "Articulating Moored Profiler System" filed on Oct. 2, 2015. The entire contents of U.S. Pat. No. 5,869,756 "Moored Water Profiling Apparatus" filed Feb. 11, 1997 and U.S. Pat. No. 5,665,909 "Free-Fall, Wire-Guided Hydrographic Profiler" filed May 17, 1996 are incorporated herein by reference and without disclaimer.

FIELD OF THE INVENTION

The present invention generally relates to techniques for observing and conducting experiments on aspects of a water column, particularly in deep water and strong water currents over a period of time using one or more sensors and/or samplers.

BACKGROUND OF THE INVENTION

Measurements of physical and chemical attributes of water bodies are commonly made by lowering instruments from a surface vessel to the bottom of a body of water such as the ocean, a lake, or a river. Water depths can range from a few meters to nearly ten thousand meters. The location from which the data is taken is commonly referred to as a hydrographic station. The water properties can change substantially over time. Therefore, the frequency of measurement needs to be commensurate with the rate of change of the water properties.

The frequency by which these measurements can be made is governed by the logistics of re-occupying the observation locations or stations. It is now recognized that a number of important ocean circulation and limnological phenomena occur episodically, and that there are short and long-term changes in water properties. More frequent sampling, or sampling initiated by a measured change in the environment, is needed to elucidate ocean or lake behavior.

While such frequent measurements have been extremely difficult to obtain, the limited number of studies that have re-occupied the same site many times over a period have proven to be extremely valuable. For example, an investigation by J. R. Lazier in 1980 of the Labrador Sea documented the effect of low-salinity surface water on deep water convection. Undoubtedly, many other important discoveries concerning ocean water circulation await the ability to obtain long-term profiles of water properties. There remain to date scientific and operational needs for sustained ocean observations at fixed locations. Despite advances in drifting, gliding, and self-propelled autonomous instruments, use of these technologies to form "virtual moorings" over long time periods are only practical in modest ocean current environments. Long-term measurements at fixed locations are traditionally made using moored instrument systems. At a limited number of preselected depths, an instrument package is affixed to the mooring cable which is anchored to the sea floor. Traditional moored profilers are deployed on a bottom-anchored mooring; therefore, they generally remain on station even in strong flows, but their functionality is limited. For example, while the traditional profiler may be preferable to single observations, the profile over time is severely constrained by a limited number of sampling depths. Maintaining calibration of many instrument packages is time-consuming and expensive. Since each preselected depth requires its own complete instrument package, the cost to obtain the data increases proportionately to the number of sites selected.

It has been recognized that a single sensor platform that can move up and down the mooring cable may provide distinct advantages by eliminating the need for multiple sensors and multiple tethering systems. It may also provide the advantages of a single calibration applicable to all of the measurements. This is particularly important in long-term measurements where sensor drift over time may be large compared to the ocean variability.

Previous moored profiler models have been in use for the past two decades to address the need or desire to observe water properties and currents at fixed geographic locations. These profilers are traditionally propelled vertically on a mooring cable using a traction drive wheel. While these models have returned unique and valuable observations, such models have also suffered from endurance issues (often less than 1,000 km of profiling per deployment). This endurance problem is particularly problematic as profilers are routinely meant to be disposed in the water column for time periods of a year or longer. Additionally, these profilers lack the ability to provide reliable track records for profiling. It would be desirable for a profiler to fully span its programmed sampling depth range especially during times of strong incident ocean currents. Likewise, traditional profilers have suffered great issues with reliability with regards to data collection and retention. A frustrating number of mooring profiler deployments have returned incomplete profiles and/or sampled for less than planned periods due to issues such as premature battery depletion. Given the number of variables at play in an ocean environment, a failed or only partially successful deployment means, from a scientific standpoint, the complete loss of information that will likely never be acquired or duplicated. These performance issues have dampened community interest in using and inventing in profilers.

Existing moored systems also suffer from a number of other functional defects. For example, they routinely fail to reach bottom stop depth while having limits on depth of operation. Others slip by losing traction of the drive wheel. Still others have suffered from lost performance in strong water currents. As a whole, the units have been unreliable at times, either concerning the ability to stay at specific depth when resting between profiles or inconsistent profiling speeds or unreliable time series and data collection which causes profiles to exceed allotted amounts of battery power.

Therefore, there is an unmet need for a re-designed mooring profiler able to better support oceanographic research and industrial programs that, in one or more embodiments, is adapted for use in strong current conditions with increased reliability and length of deployment in addition to a higher quality data return. A redesigned Articulating Moored Profiler System is provided herein which, in one or more embodiments, seeks to provide at least one of the following benefits: (1) improved profiling reliability across various environments, including stronger flows and in instances of misballasting; (2) increased profiler endurance; (3) a more flexible layout in relation to where sensors can be mounted onto or inserted into the profiling vehicle which may include the ability to place sensors outside the fluid boundary layer of the vehicle; (4) a streamline sensor interface which can improve the operator interface and/or enhance the flexibility of data logging; (5) a more robust and better quality brake system; and (6) a power generating system using high incidental currents.

DESCRIPTION OF THE DRAWINGS

The drawings constitute a part of this specification and include exemplary embodiments of the Articulating Moored Profiler (AMP) System, which may be embodied in various forms. It is to be understood that in some instances, various aspects of the invention may be shown exaggerated or enlarged to facilitate an understanding of the invention. It should be understood that the drawings are not necessarily to scale; instead, emphasis has been placed upon illustrating the principles of the invention. In addition, in the embodiments depicted herein, like reference numerals in the various drawings refer to identical or near identical structural elements. Other features and advantages of the present invention, as well as the invention itself, can be more fully understood from the following description of the various embodiments, when read together with the accompanying drawings, in which:

FIGS. 6A and 6B are schematic views of the embodiment from FIG. 4 to show the components of the embodiment wherein

FIGS. 8A-8C show various angles of the attachment mechanism used in one embodiment of the articulating moored profiler to attach the vessel body to the mooring mechanism. As shown, FIG. 8A is a straight on view of the attachment mechanism while

FIGS. 11A and 11B depict flow modeling over the system fin design shown in terms of water velocity vectors. As shown.

SUMMARY OF THE INVENTION

The present invention relates to systems and methods for a water profiling device designed for streamlined operation in the strong water currents whiles submerged in an aquatic environment such as the ocean, a lake, a river, among others, to provide high reliability and longer endurance during deployment in addition to increased sampling capabilities using a high resolution sensor array.

A submerged profiler is disclosed and claimed herein comprising, generally,
 a vessel body connected to an external mooring mechanism via an attachment mechanism,
 a drive system for maneuvering the vessel body longitudinally about the mooring mechanism;
 an articulating mechanism; and
 a sensor array capable of measuring a parameter for study.

In one or more embodiments, at least one sensor of the sensor array is disposed within the body. In alternate embodiments, the sensor array is capable of measuring at least one parameter selected from the group comprising conductivity, temperature, depth, turbidity, dissolved gas, fluorescence, pressure, light level, pH, a chemical, electrical current, battery status, and water current velocity. In an alternative embodiment, the sensor array is omitted.

In alternate embodiments, the vessel body is capable of articulating about the mooring mechanism via the articulating mechanism. In a preferred embodiment, the vessel body is capable of articulating about the mooring mechanism so as to place the vessel body in relation with the three dimensional current. In alternate embodiments, the vessel body is articulated such that at least one sensor is positioned into the current so as to sample or measure undisturbed water.

In one or more embodiments, a lift assist system in the form of hydrofoils or wings are mounted to the vessel body to assist with the hydrodynamics of the vessel body. In alternate embodiments, the wings can be manipulated to harness the current force and maneuver the vessel body. In further embodiments, the driving force generated by the wings from the current move the vessel body along the mooring mechanism. In still further embodiments, the drive system utilizes the driving force to generate electricity.

In embodiments wherein the profiler is used at too great of a depth to draw power from the surface, an onboard power source such as a battery is employed.

Definitions

The term "mooring mechanism" is used herein as a general term to signify any commonly known tension member, including cord, rope, wire, cable, and the like used for securing and suspending an aqueous environment, for example the ocean.

The term "articulate about" as used herein refers to the movement of the AMP device as it moves about a mooring mechanism. The degree of freedom of the movement about the mooring mechanism depends on the embodiment. In most currently preferred embodiments the degree of freedom ranges from 360 to 90 degrees.

DETAILED DESCRIPTION OF THE ILLUSTRATED EMBODIMENTS

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies.

Furthermore, the described features, structures, or characteristics may be combined in any suitable manner in one or more embodiments. In the following description, numerous specific details are provided, such as examples of vessels, water jets, deploying mechanism, and sensors. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention. Other components and apparatuses may be conceived that are equivalent in function, logic, or effect to one or more mechanisms, or portions thereof, of the illustrated Articulating Moored Profiler ("AMP") Device.

The invention may be better understood through the following detailed description describing various embodiments to a system adapted to repeatedly transport a sensor suite vertically through the water column to acquire high vertical and high temporal resolution observations of various aspects and parameters of the sampled body of water.

Scientific and operational needs exist for sustained ocean observations at fixed geographic locations. Despite advances in drifting, gliding, and self-propelled autonomous instruments, existing technologies used to form "vertical moorings" have yet to fill the void for long-term deployments in conditions more than modest ocean currents (e.g., 25 cm/s or less). Other mooring profilers, deployed on bottom-anchored moorings, are capable of remaining on station in strong water flows (e.g., 25 cm/s or greater, up to 1 m/s, 2 m/s, 3 m/s) but lose functionality, reliability, and/or accuracy of measurements. Existing moored profilers suffer additional drawbacks including the fact that that the sensor integration into the profilers is restrictive (both electronically and physically), preventing further adaption to the needs of the user.

An improved articulated moored profiler device is described and claimed herein that is (1) capable of supporting a plurality of ocean science studies currently desired in the field, including the response of ocean flows incident on bathymetric features, and (2) is adaptable to meet the needs of future research. The AMP device is designed to address the shortcomings of existing models while further enhancing the profiler device's capabilities. In so doing, numerous advancements have been incorporated into the AMP that relate to the profiling vehicle itself and its interface with a variety of sensors. Additionally, in various embodiments, the AMP device incorporates one or more of the following advantages over the prior art: improved profiling reliability, particularly in stronger flows and in cases of misballasting (in other words, an amount of ballast that results in an undesired amount of ballast), increased profiling endurance, more flexibility in where sensors may be effectively mounted on the profiling vehicle and collection of higher resolution sensor data by placing them (or a sensor inlet) outside the fluid boundary layer of the vehicle, streamlined sensor interfacing, improved operator interface, enhanced flexibility of logging and collecting additional and more thorough diagnostics of system performance, and implementation of a higher quality functioning braking system. In some embodiments, the AMP device uses high flow currents to generate electricity to recharge its power supply, turning a disadvantage to commonly known profilers to an improvement. Furthermore, the AMP device manages these advancements while continuing to be reasonable in size and weight to manage on the deck of a vessel or platform during deployment and at recovery.

The AMP device disclosed herein comprises, generally, a longitudinal vessel body 102, a sensor array comprising one or more sensors 104, a drive system 106, an electronics housing 108, a controller 110, an attachment mechanism 112 for connecting the vessel body 102 to a mooring mechanism 122, a lift assist system 114, a lift control system 116, an articulating mechanism 118, and at least one power source 120 in electronic communication with the sensor array 104, controller 110, lift control system 116 and/or articulating mechanism 118.

The overall design provides a longitudinal vessel body 102 that is able to articulate (e.g., pivot, maneuver, align) about the mooring mechanism 122 through an articulating mechanism 118 to align the vessel body 102 with the relative three-dimensional incident flow. As depicted, the longitudinal vessel body 102 comprises a relatively long, thin cylindrical body that extends from a front or bow section (also referred to as the "leading end" when discussing orientation into the current flow) to an aft section with a middle or belly section in between the front and aft sections. The overall length and girth of the vessel body are a balancing act to increase storage capacity for sensors, electrical equipment, and power supplies (i.e., batteries), while reducing the drag that current will have on the vessel body. This balancing in engineering must further incorporate the buoyancy of the system, particularly as the system articulates and pivots about the mooring mechanism (e.g., cable). As will be discussed, various embodiments of the AMP have the capability to employ several means for adjusting buoyancy before and during operations such as the buoyancy spheres 124.

The attachment mechanism 112 secures the vessel body 102 to the mooring mechanism 122 in such a manner to allow the vessel body 102 to efficiently pivot/swivel into the present current flow while resisting the water forces from unintentionally altering the system profiling. As depicted, the attachment mechanism 112 is connected to the longitudinal vessel body 102 forward of the middle section; however, it is possible for the attachment mechanism to be connected at either the most front, middle, or most aft ends as well. Because the attachment mechanism 112 as depicted is connected to the longitudinal vessel body 102 at a position forward of the middle section, the terms leading end (e.g., front section), middle section, or tail end (e.g., aft section) are relative as they can be interchanged depending on the configurations. The distinctions are purposefully more pronounced in the illustrated embodiment as the depicted embodiments incorporate sensors on the front or leading end with tail fins on the tail section.

The longitudinal cylindrical vessel body was chosen as an illustrative example due to its hydrodynamics that provide minimal drag in comparison to other shaped bodies (to be discussed in greater detail below). However, it is readily understood that various shapes and sizes of a vessel body can be employed including spheroid (e.g., oblate spheroid), conoidal, rectangular, barrel-shaped, elliptical, ovaloid, oblong, circular, tubular, etc. It remains preferable that the body be designed to minimize drag caused by the current of the marine environment in which the device is to be employed. The drag affects the endurance of the device because energy needs to be expounded to counter its force, both in keeping the device stationary and, particularly, when adjusting the position of the device.

Figure 4:
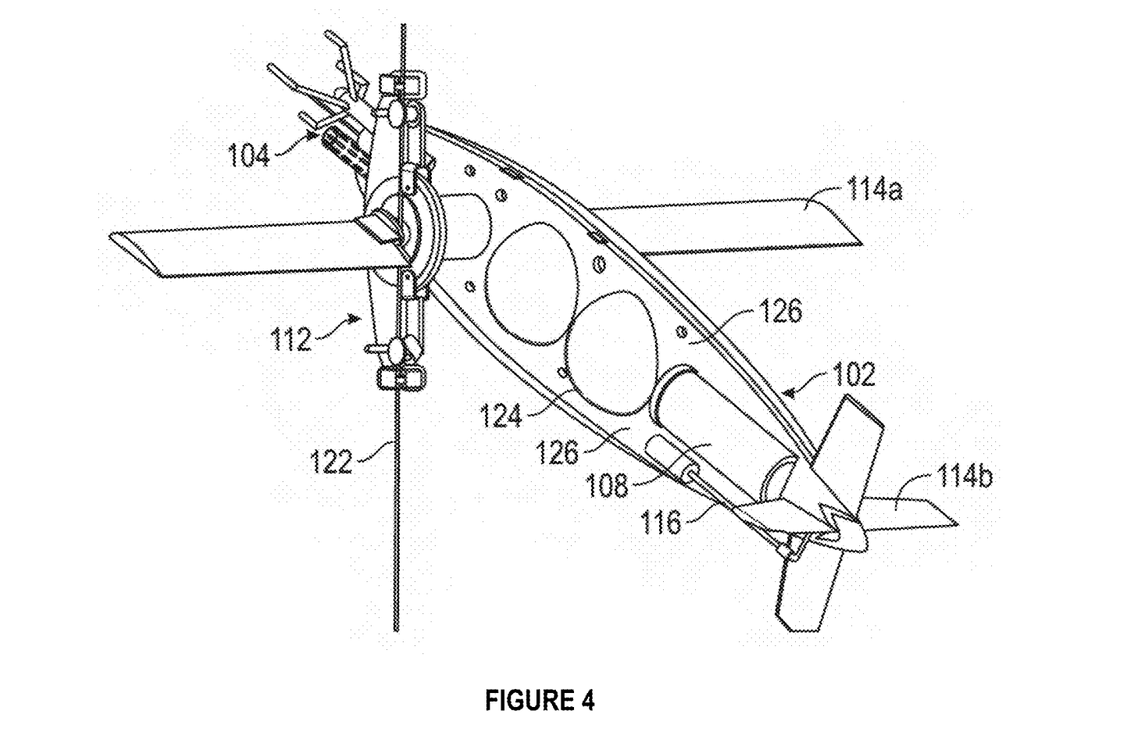
FIG. 4 is another illustrated embodiment showing a frontal view of the components of an articulated moored profiler comprising a singular elongated vessel body that has been made transparent to show the inner components.
Figure 7:
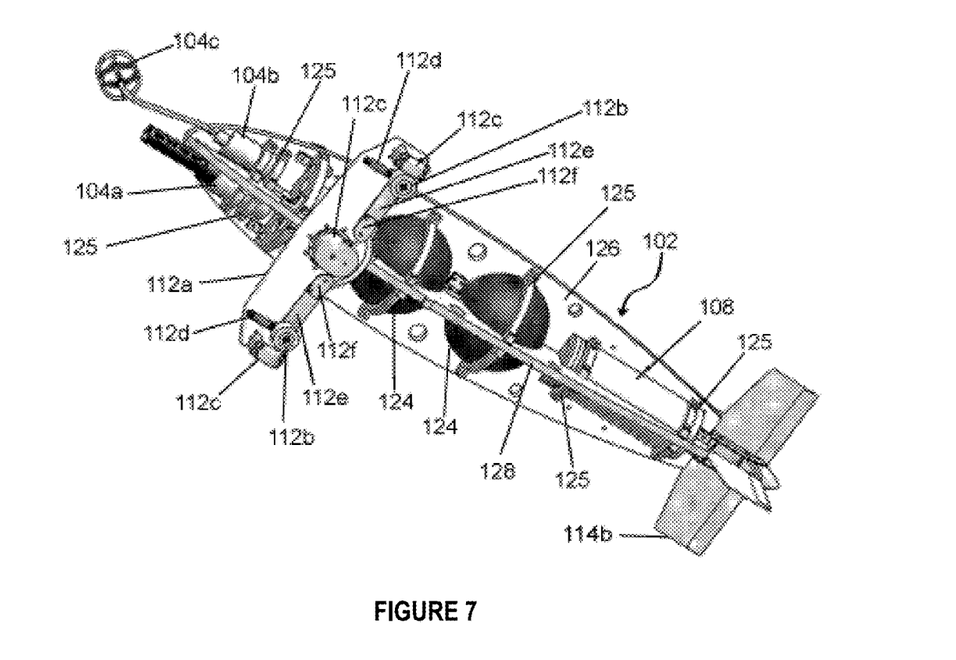
FIG. 7 is an angled side view of a three-dimensional rendering of the schematic in FIG. 6.
Figure 8A:
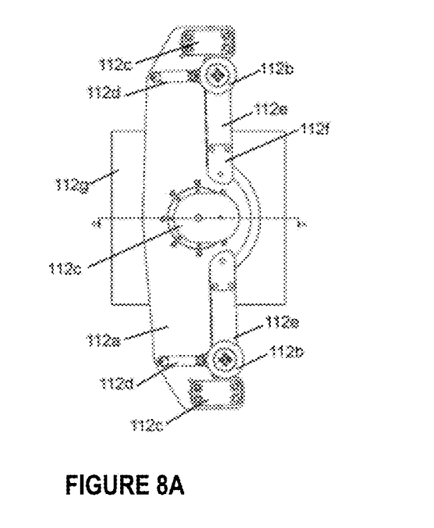
Figure 8B:
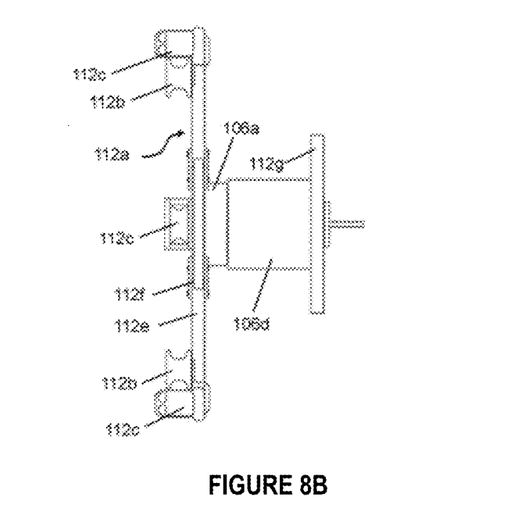
FIG. 8B is a side view and FIG. 8C is an angled view of the same attachment mechanism.
Figure 8C:
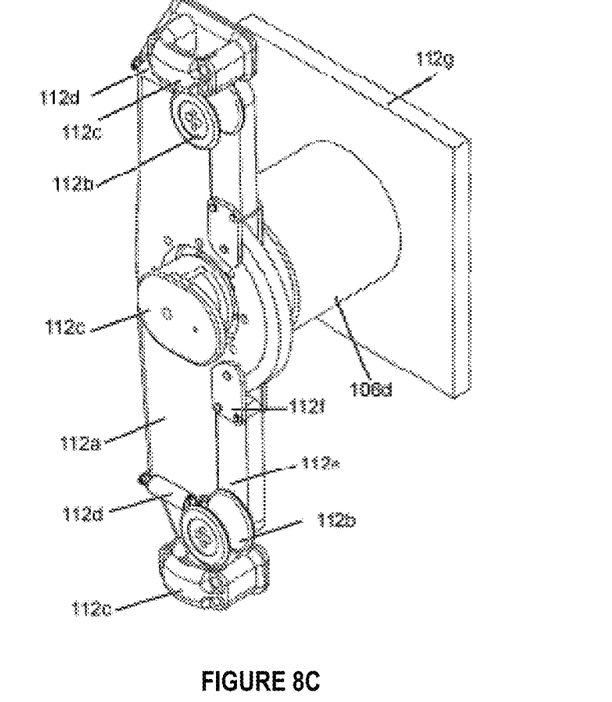
Figure 9A:
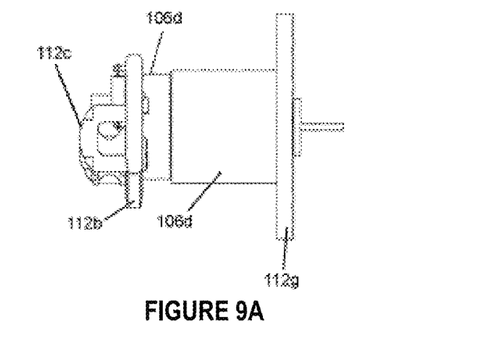
FIGS. 9A and 9B show the outer casing of the drive system in FIG. 9A and a cross section view of the inner components in FIG. 9B.
Figure 9B:
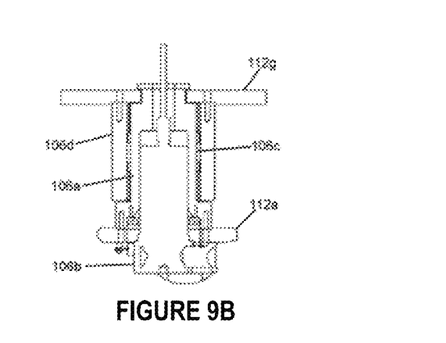
Figure 10:
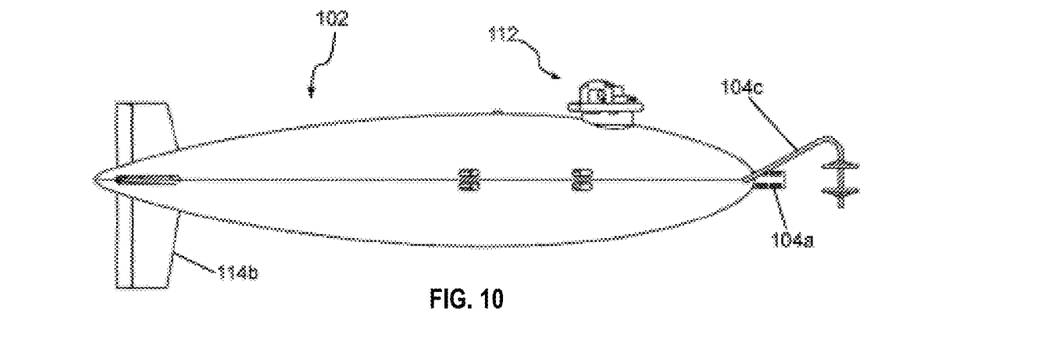
FIG. 10 is an illustrated embodiment depicting top down view of the vessel body.

The interior frame of the vessel body 102, in many embodiments, is designed with several factors in mind, including safely securing the internal components, robustness necessary for in stronger environmental conditions and increased pressure forces at deeper water depths, weight management, and manufacturing cost. As shown in FIG. 7, the interior frame is comprised of one or more vertical plates 126 and one or more horizontal plates 128 secured together at a desired angle. As depicted in the embodiment of FIG. 4, the internal frame may only comprise one plate, either a vertical plate 126 (as shown) or a horizontal plate (not shown). In the embodiment shown in FIG. 7, a vertical plate 126 and two horizontal plate 128 are mechanically engaged approximately 90 degree angles and secured using fasteners (e.g., nuts, bolts, pins, screws, or the like). This provides an optimal amount of internal space to include operating components and buoyancy mechanism while maintaining a frame that can withstand up to full ocean depth. The internal frame may be manufactured from any material of suitable strength that can be matched to the buoyancy requirements including, but not limited to, aluminum, titanium, steel, stainless steel, steel alloy, thermoplastics, among others as known in the art.

The vessel body 102 further comprises a shell adapted to provide the streamlined body shape and maintain integrity of the internal components against water and pressure damage. The shell is further designed to employ a body shape capable of utilizing lift gained by use of the lift assist system 114. The shell is generally as thin as possible to reduce excess weight (and extra buoyancy compensation) while still meeting the necessary strength requirements for operation. The shell may be comprised of a top portion and a bottom portion wherein both the top and bottom portions are sealed together in a water-tight manner over the internal frame to create the streamlined body illustrated in FIG. 4. Similarly, the shell may be comprised of two or more lateral portions which are sealed water-tight. The shell is generally comprised of a thin yet durable material such as polyethylene (e.g., ultra-high molecular weight polyethylene), thermoplastic, or the like.

The purpose of the AMP is to take profiles underwater which typically includes repeated measurements of one or more parameters down and/or up through the water column. Thus, the AMP employs a sensor array 104 of one or more sensors to take measurements and readings while in operation. Dependent on the particular mission on which the AMP employed, numerous sensors may be useful under the circumstances and specific applications that allow for the collection of readings on temperature, location, conductivity, salinity, magnetics, depth, current, gravity, oxygen, carbon, nitrogen, or light (e.g., fluorescence, bioluminescence), to name a few. Thus, thermometers, magnetometers, hydrometers, radar, depth sensors, pressure sensors, gravitometers, oximeters, light meters, fluorometers, GPS, seismographs, Geiger counters, current meters, CTD's (conductivity/temperature/depth), acoustic current meter (ACM), and salinometers may be mounted to the vessel body 102 (or the attachment mechanism 5) such that they can be employed during operation. In other embodiments, the AMP is designed to house any of the numerous sensors currently employed on moored profilers from the prior art. For example, the sensors may also be selected from the group comprising the Seabird 52MP CTD, Teledyne RDI Micro CTD, Falmouth Scientific current meter, Nobska modular acoustic velocity sensor (MAVS), Seabird 43F dissolved oxygen sensor, Satlantic Submersible Ultraviolet Nitrate Analyzer (SUNA), Nortek Aquadopp current meter, Seabird Inductive Modem, Biospherical Instruments Photosynthetically Active Radiation (PAR), WET Labs Optical Sensors, Seapoint fluorometer, Seapoint turbidity sensor, Aanderaa optode, the OceanServer motion sensor, or any later generations thereof. In some embodiments, the device employs one or more sensors to sample aspects or features of the body of water such as conductivity (e.g., salinity), temperature, depth, light level, turbidity, dissolved gases (e.g., oxygen, nitrogen), fluorescence, bioluminescence, pressure, pH, a chemical, radioactivity, water currents (e.g., meandering currents, eddies, rings, hydrographic fronts, rip currents, feeder currents, tides) and any measurable parameter of the water. In some embodiments, the device is capable of taking water samples from the environment for analysis at a later time.

Figure 6A:
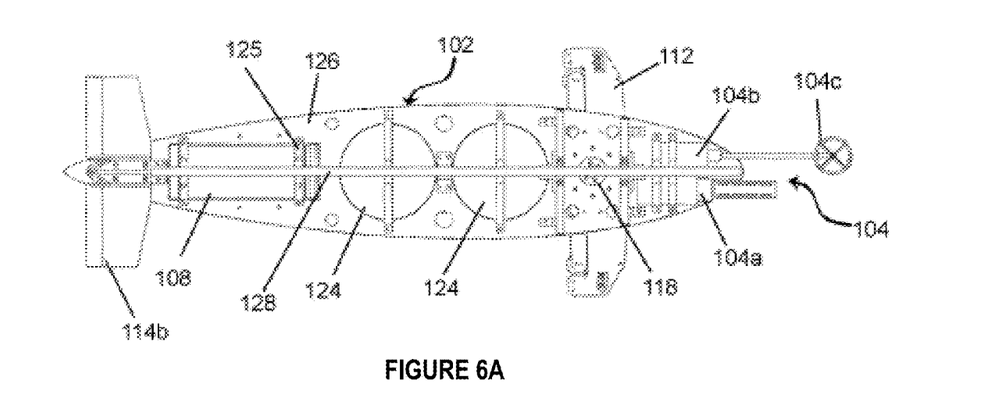
FIG. 6A is a view form the port side and FIG. 6B is a view from the starboard side.
Figure 6B:
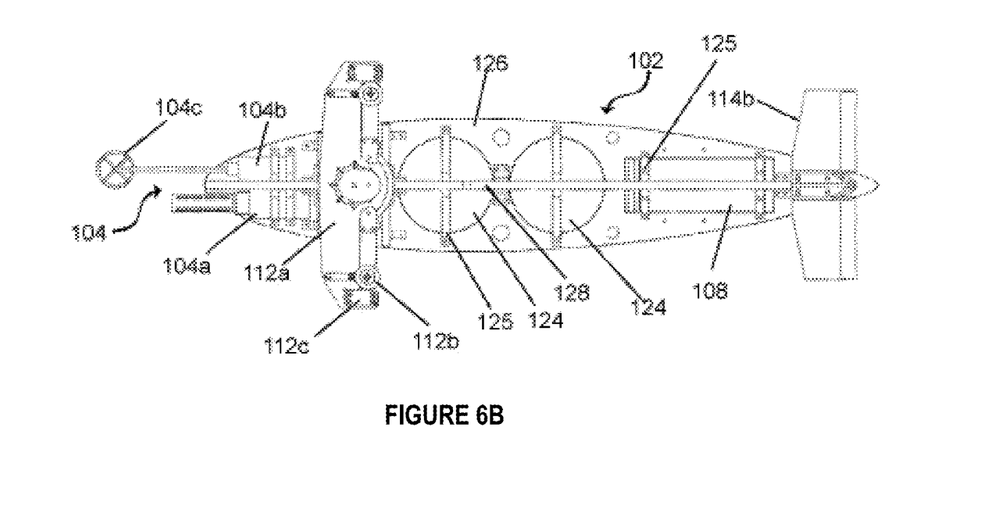

As existing models often struggle to arrange the sensors and the drive system at the mid-point of the profiling vehicle, the depicted embodiments of the AMP device separate the drive system 106 from the sensors 104, and moreover, naturally orients the sensors 104 at the leading end of the body 102 to allow sensing in undisturbed water (i.e., water which has not been altered by the presence of the device, water in its naturally occurring state). This adaptation also provides more flexibility in mounting multiple sensors such as bio-optical devices in addition to a CTD and current meter. Further enhancing the abilities of the device is the new controller 110 which facilitates the addition more sensors of various types. Additionally, placing the sensor array 104 at the leading edge of the vessel body 102 facilitates operator access for maintenance, sensor adjustment, or repair. In other embodiments, the sensor array 104 is disposed on the aft or trailing end of the device. In another embodiment, the sensor array 104 is arranged at one or more positions on the leading end, trailing end, or the middle region of the vessel body 102. In many embodiments, one or more sensors in the sensor array 104 are mounted at the leading end of the body to sample undisturbed water. As depicted, the sensors 104a and 104b are housed in a compartment in the leading end of the longitudinal vessel body 102. The input of sensor 104a is a collection tube that projects from the front of the longitudinal body 102 to allow for fluid to pass into the sensors. These sensors 104 are in electronic communication with a power source 120, which is typically a battery. In the depicted embodiment of FIGS. 6A and 6B, a sensor rod 102c connected with sensor 104b further protrudes from the leading end of the AMP to measure water current.

As depicted, embodiments can be utilized wherein a water sample will enter the sensor compartment. Thus, it may be desirable to separate the sensors 104 from the electronic controller 110 and power source 120, which are depicted to be located it the electronics housing 108 in the aft section of the vessel body 102. Electronics housing 108 is a container in which one or more electronic devices such as the controller 110 and power source(s) 120 can be housed. It may be pressurized and/or waterproof depending on the embodiment and mission. In several embodiments, the electronics housing 108 is a pressure housing with a depth rating of up to 6,000 m. In another embodiment, the electronics housing 108 is rated to depths greater than 6,000 m. The housing 108 is generally comprised of a robust material such as metal including titanium, aluminum, steel, or other suitable materials as known in the art. Balancing the device for buoyancy reasons may also dictate the location of the power source and controller in relation to the sensors, although it is conceivable that an AMP can be made wherein one or more sensors, power sources, and controllers, can be placed throughout the vessel body either in electronic communication with each other or otherwise in insular systems.

As a moored profiler, the AMP is connected to a mooring mechanism 122 as would be recognized by one having ordinary skill in the art and as further shown in FIGS. 1-4. Turning to FIGS. 8A-9B specifically, a mechanical drive system 106 is employed wherein the mechanical drive system 106 comprises a drive engine 106a that mounts on the mooring mechanism 122 via an attachment mechanism 112 whereby the main vessel body 102 is supported by the mooring mechanism. As will be explained, the vessel body 102 is connected to the mooring mechanism 122 through the tension created as the mooring mechanism 122 passes through a plurality of grooved wheels (the drive wheel 106d and the guide wheels 112b).

Attachment mechanism 112 comprises a longitudinal truck plate ("truck") 112a, at least two guide wheels 112b, and a set of one or more cable guides 112c. The truck 112a is a longitudinal plate on which the guide wheels and cable guides are mounted and able to withstand the forces on the cable particularly in strong current conditions. The cable guides 112c comprise brackets orthogonally connected to the truck 112a on opposite ends of the longitudinal truck 112a through which the mooring mechanism 122 is passed. It is preferred that the hole in the cable guides be lined with a material to soften impact with the mooring mechanism, thereby limiting the potential to fray the wire (when the wire is made of a material susceptible to fraying). In some embodiments, the cable guides and/or guide wheels are coated with a protective material such as urethane, polyurethane, organic polymer, inorganic polymer, thermoplastic urethane, oil, and other lining materials as known in the art. The guide wheels 112b are connected to the truck 112a via idler arm support 112e in substantial proximity to and on the interior side of the cable guides 112c. The idler arm support 112e is attached to the truck 112a by an idler arm tab 112f to provide pivoting support for the attachment mechanism 112. These guide wheels 112b act as both stoppers and retaining rings capable of retaining the device in a stationary manner on the mooring mechanism 122. The guide wheels 112b are connected to the truck by tension springs 112d that pull the guide wheels 112b towards the drive wheel 106d, thereby keeping tension on the mooring mechanism 122. In one or more embodiments, the tension springs 112d can controllably be manipulated to increase or decrease tension on the guide wheels, such as may be needed to act as a brake or to lock the unit in place. Additional grooves can be formed in the guide wheels 112b and drive wheel 106d to help grip the mooring mechanism. The mooring mechanism 122 may be any suitable cable or line of sufficient strength properties to serve as a connection to the bottom of the water column.

The drive system 106 comprises a drive engine 106a, a drive motor 106b, a drive wheel 106d, and optionally a pressure vessel 106c. The drive wheel 106d is positioned substantially in the center of the truck 112a and is manipulated by a drive engine 106a that is capable of rotating the drive wheel 106d to maneuver the vessel body 102 up and down the mooring mechanism 122. The drive engine 106a is mounted through the attachment mechanism 112 such that a substantial portion of the engine 106a sits on the vessel body side of the truck 112a, but remains connected to the drive wheel 106d. The drive engine 106a is positioned forward of the mooring mechanism 122 with the drive wheel axel orthogonal to the vessel body axis. The drive engine 106a uses an electric motor 106b in a dedicated pressure vessel 106c that turns the drive wheel 106d on the opposite side (held in tension against the mooring mechanism 122) using a magnetic coupler across the pressure case wall. The magnetic coupler can be further employed as a brake by locking the drive shaft of the motor. The drive system 106 is electrically connected to the power source 120 and most often informationally connected to the controller 110. In some embodiments the drive system 106, is designed to act as a generator and generate electricity. Power generation may be done by any suitable means known in the art. In some embodiments drive system 106 is electrically connected to sensor array 104, enabling the drive system 106 to power sensor array 104 during periods of power generation.

The electric motor 106b may be any suitable motor as known in the art. When a voltage is applied to motor 106b, it rotates a speed dictated by the motor windings and the applied voltage. When the motor 106b is turned faster than that speed, the motor generates electricity. In this scenario, the back emf (electro motive force) of the motor is proportional to rotational speed. Back emf of one embodiment at a device profile speed of 25 cm/s is about 11.5 volts. If the device is driven by environmental energy to 1 m/s, the back emf increases to approximately 46 volts, enabling power generation. The simplest case is the 'zero speed case'; when no voltage is applied to motor 106b and the drive wheel 106d is turned, resulting in power (i.e. electricity) generation. When a generator embodiment is driven along the mooring mechanism 122, the device gets moved by the current faster than the motor 106b is turning, generating electricity. If the environmental energy is too strong, the device may reduce lift assist system 114 pitch (angle of attack) to reduce speed of device along mooring mechanism 122, to protect the power electronics against too much voltage produced by drive system 106.

The attachment mechanism 112 may be further modified by adding a cowling or a cover over the outer face of the attachment mechanism 112. This serves several purposes including further drag reduction, less component biofouling, and additional impact protection of the mooring attachment components. In some embodiments, the cowling covers the truck plate components while still allowing flushing of biological material from around the components (e.g., drive wheels). In some instances, the truck plate 112a (and other components exposed to the surrounding environment) may be coated with an antifouling paint or other coating which prevents organisms and marine debris from attaching to the surface and building up.

A key advantage of the present invention is the ability to manipulate the vessel body 102 both to align the vessel body 102 with the relative three-dimensional incident flow, thereby reducing drag, and to align the sensors 104 such that they are able to sample undisturbed waters. Additionally, the system is designed to align relative to the current flow to harness the flow forces to thereby assist the system in profiling upward to minimize power consumption. Existing profiler models have struggled to perform in the face of the drag forces exerted upon the profiler body and vortex shedding when attempting to operate in strong current environments, causing the profiler to lose traction, fail to profile over the programmed depth interval, and deplete the power source prematurely. The instant AMP solves this problem because the longitudinal vessel body 102 is able to articulate about the mooring mechanism 122 to align with the relative three-dimensional incident flow. As depicted, the improved Articulating Moored Profiler incorporates an articulating mechanism 118 that allows the hydrodynamic body of the profiler to rotate, pivot, and align both horizontally about a cable and vertically in response to the three-dimensional incident relative current flow past the profiler. Depending on orientation, the longitudinal body may need to either be able to articulate vertically or horizontally (or both) about the mooring mechanism 122 to align with the relative three-dimensional incident flow, so it is important for the pivot mechanism to be able to accommodate the articulation needed for the set up. In certain embodiments, the articulating mechanism 118 allows the vessel body 102 to articulate 360 degrees horizontally about the mooring mechanism 122. In various embodiments, it may be desirable for the AMP to be able to pivot ±90 degrees about its attachment point to the truck 112c that supports the drive and spring-mounted guide wheel sheaves. In certain embodiments, the vessel body 102 is able to articulate substantially vertical up to ±90 degrees relative to the mooring mechanism 122. In other embodiments, the articulating mechanism 118 may be adjusted to only allow the vessel body 102 to pivot to a designated degree relative to the mooring mechanism 122 such that the body may only up to an angle of 45 degrees, 60 degrees, and so forth in one or both vertical (up/down) and horizontal directions.

As depicted, the articulating mechanism 118 comprises a lockable and rotatable bracket or gear connected to both the vessel body 102 and to the attachment mechanism 112, generally through or in proximity to the drive system 106. Numerous types of hinges, brackets, ball joints, and other connected may be employed that are capable of allowing a pivot action between the vessel body 102 and the mooring mechanism 122. As the AMP adapts, either by active or passive manipulation, to provide the most efficient position to reduce drag in these strong flow environmental conditions or to orient sensors as may be desired, these forces have substantially less effect on movement control and reliability. By orienting into the relative flow, the AMP also improves the quality of data from sensors mounted on its leading end. Any wakes from the mooring mechanism or vehicle body are downstream from the sensing volume of the probes so the water being sampled is relatively undisturbed.

Typically located in the aft end of the longitudinal vessel body 102 is a power source 120 in the form of a battery to power at least the sensors, the controller, and the drive system. In some embodiments the power supply is rechargeable, enabling the drive system 106 to act as a generator when the AMP device experiences high currents. It should be noted that the AMP is designed to be used in marine environments and therefore pressure will be exerted on the unit and its components. This can be particularly detrimental to batteries and smaller electronics so it can be advantageous to employ pressure case(s) for batteries and to adapt the main controller for deep water (e.g., up to 1,000 m, 3,000 m, 6,000 m, 6,500 m, 8,000 m, and full ocean depth). The device may employ a main power source and additional battery packs for backup power. In some embodiments, the power source 120 is a rechargeable battery such as a rechargeable lithium battery; however, the power supply may include any suitable power source that can power the device through profiling completion either with or without the use of the lift assist system 114 described in more detail below.

Energy efficiency is a large problem in underwater profilers as the power generally has to be provided onboard the vessel, particularly when the vessel is to be deployed at great depths. Thus, to increase the profiling endurance of the unit in operation, the AMP further incorporates, in one or more embodiments, numerous energy saving mechanisms. Endurance is defined by the distance of cable traveled by the profiler during a mission. The articulating mechanism 118 in combination with the streamlined vessel body 102 has substantially increased endurance to about 2 million meters, double of previous profiler endurance. Additionally, the lift assist system 114 further adds to the device endurance as well as increases battery usage which may be applied to longer profiling missions, more sample measurements, and/or additional or high power-consuming sensors.

One of the more promising energy saving mechanisms is through the incorporation of a lift assist system 114. As depicted, the lift assist system 114 comprises at least one of a wing set 114a and a fin set 114b (e.g., adjustable wing set, adjustable fin set). Several embodiments of the inventive system employ both a wing set 114a and a fin set 114b. Additional embodiments may utilize more than one wing set 114a and one or more fin sets 114b. In other embodiments, the device comprises a wing set 114a or a fin set 114b. In additional embodiments, the device comprises a lateral fin set arranged laterally on the vessel body 102 in an orientation adapted to be controlled by the lift control system 116 or in a fixed orientation.

Figure 5:
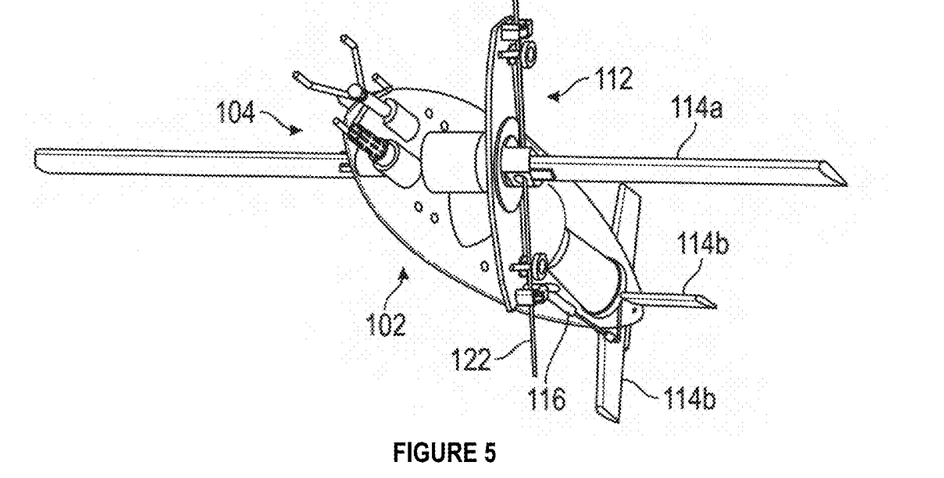
FIG. 5 is a front angular view of the same embodiment as in FIG. 4 to further illustrate components of the embodiment.

As shown in FIGS. 4 and 5, the wing set 114a is arranged forward on the vessel body 102 aligned with the attachment mechanism 112. In other embodiments, the wing set 114a is arranged near or at the middle section of the vessel body 102. The wing set 114a may be controlled by the drive motor assembly 106 or lift control system 116 to obtain the optimal angle of attack for propelling force or in other cases may be securely attached in a fixed orientation at a specified angle using fasteners.

The AMP device further aims to increase profiling endurance (as well as reliability) by using lift foils and/or employing a body shape in various embodiments to gain lift from the incident ocean currents (and thus generating a lifting force) to assist the drive motor(s) in propelling the vehicle up and down the mooring mechanism. It is exactly during these periods of strong incident ocean currents that existing profilers have difficulty profiling, whereas the present invention harnesses these currents to extract a lift force which reduces power consumption, or even generates power. However, it is not just these extreme events that are of interest; due to tides, internal waves, and mesoscale motions, there is high probability that incident ocean currents of several cm/s or more will always be present at a given mooring site, depth, and time. Any lift forces that can be gained from the ocean flow is, in effect, "free" energy. This "free energy," also referred herein as "environmental energy," a motive force not supplied by the drive system 106 using power from the power source 120. A force, or "lift force" should be understood as a force acting in parallel to the device's direction of movement, not only in the up direction. For example, if the AMP device is moving down (i.e. deeper underwater) along the mooring mechanism, a lift force generated by the lift assist system would aid the AMP device in moving down the mooring mechanism. Likewise, when the AMP device is moving up (e.g. towards the ocean surface), a lifting force would act by forcing or driving the device upwards on the mooring mechanism. The AMP system orients wings (e.g., fins) and/or a lifting body-shaped vehicle relative to the three-dimensional incident flow to obtain an assist when moving along the mooring mechanism 122 and/or to help maintain a depth while resting between profiles.

Lifting foils in the shape of wings 114a or fins 114b to extract lift (either up or down along the mooring mechanism) out of the current, effectively harnessing environmental energy that saves battery power and extends operational life of the AMP. In one or more embodiments, the AMP employs a wing mechanism (e.g., one or more fins, wing set 114a, fin set 114b) to harness the forces of strong incident water currents and translate these forces into vertical movement to propel the device vertically along the mooring mechanism 122. Beyond improving performance at times of strong water currents (a shortcoming of existing systems), the capacity to utilize environmental energy allows the profiler to use less power supply-derived energy, thus allowing all or some of the following: extending the endurance of the device, allowing the integration of higher energy-consuming sensors, the more frequent use existing sensors, or generating energy to recharge the power source 120. In the uni-vessel embodiments shown in FIGS. 4 and 5, symmetric-profile wings 114a are applied to the AMP vessel body 102 and a controller-adjustable "elevator" tail fin 114b is employed to set the vehicle pitch and thus adjust the altitude of the wings to the incident relative flow. By "elevator" tail fin, it is shown that the tail fin set 114b of the lift assist system 114 is attached to the lift control system 116 which in this embodiment is a hydraulic piston that manipulates at least one tail fin up or down to adjust the amount of draft it catches from the current, referred to as the angle of attack. The angle of attack is a common term in the art to describe the angle of a fin or wing relative to the incoming incident current flow. In certain embodiments, the angle of attack is between 1 to 20 degrees relative to the flow.

Figure 3:
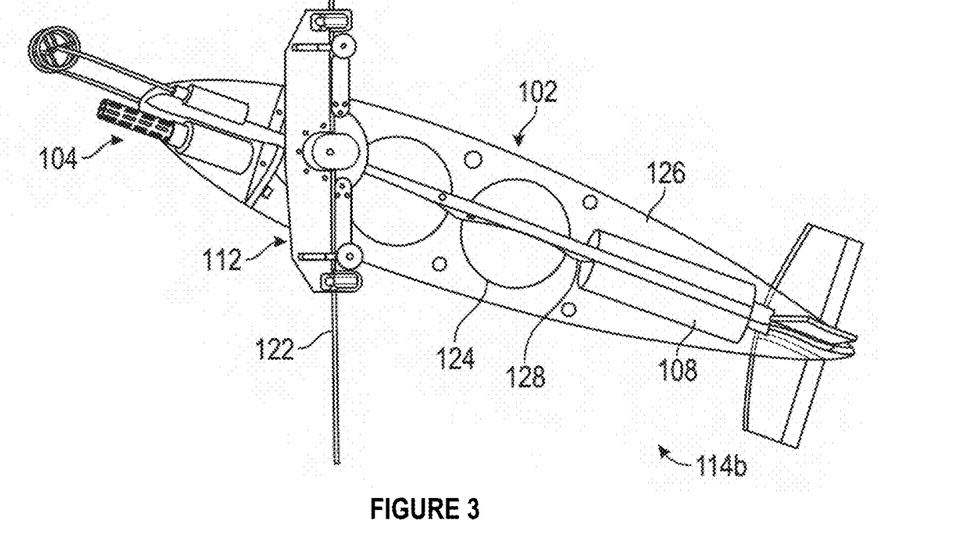
FIG. 3 depicts a side view of one illustrated embodiment of the articulated mooring profiler comprising a single body disposed on a mooring mechanism.

As shown in FIG. 3, the fins 114b positioned on the aft end of the vessel body 102 perpendicular relative to the body. In certain embodiments, the fins 114b on the top and bottom surfaces of the vessel body 102 are angled by a few degrees (i.e., angle of attack, typically within 1-5 degrees) to compensate for the off-center attachment to the mooring mechanism 122 by the attachment mechanism 112.

Example 1 further describes key aspects of the lift assist system and angle of attack. This can be used to controllably utilize the lift provided by the current. Although the wings 114a are generally designed to work in concert with the drive system 106, it is conceivable that enough lift can be generated in certain embodiment such that the AMP device can be maneuvered with little to no energy being employed to the drive system 106, and even drive the drive system 106 in reverse, generating electricity. Other embodiments employ other means than a hydraulic piston in the lift control system 116 including a mechanical actuator, linear actuator/positioner, electric motor, and any other mechanism to reliably and accurately adjust the angle of attack of the lift assist mechanism 114 preferably within an accuracy of a degree or less.

In some embodiments, the AMP device is equipped to use environmental energy to produce electricity by using the drive system 106 as a generator. These embodiments are referred herein as generator embodiments and have a lift assist system 114 having at least one of the wings 114a or fins 114b, the power source 120 is further rechargeable, and the drive system 106 is configured to be reversed and generate electricity.

Typical generator embodiments comprise a lift assist system 114 of sufficient size to transfer significant lifting force from the aquatic environment onto wings 114a and thereby push or drive the AMP device along the mooring mechanism 122 (both up and down, depending on lift assist system 114 pitch). Generator embodiments typically comprise large lift assist wings 114a. Power harnessed from environmental energy is cubed as a function of current speed. Preferred generator embodiments' wings 114a are designed to be driven up or down the mooring mechanism 122 in currents of 25 cm/s. At a current of 1000 cm/s, the power available is 64 times the power available at 25 cm/s. Some embodiments further have controls that reduce fin 114b elevator angle reducing the pitch (angle of attack) of wings 114a if the driven vertical (accent or decent) velocity is too great. Typical pitch (i.e. angle of attack) is preferably between 6-8 degrees, in some embodiments preferred pitch is between 4-10 degrees. Too steep an angle of attack and the flow over wings 114a separates and lift is lost. Too shallow an angle of attack and lift is negligible. At the laminar boundary layer's Reynold's numbers the wing 114a would stall at lower pitch angles, as compared to normal, higher engineering Reynold's numbers. Typically wings 114a are symmetric foils, enabling lift while the device is moving either up or down mooring mechanism 122.

Some generator embodiments also comprise fins 114b to give the overall device stability during high environmental currents. Generator embodiments may further adjust ballasting, buoyancy, or lift assist wing 114a or fin 114b adjustment during profiling to maximize the energy generated from environmental energy. Adjustment of ballasting or buoyancy may be achieved as described elsewhere herein and by any suitable means as known in the art. Lift assist system 114 adjustment may include changing pitch or angle of one or more fins 114b or wings 114a. Typically, wing 114a pitch (i.e. angle of attack) is set by adjusting the tail fin 114b elevator (commonly known as adjustable horizontal fins, typically on the tail of a device)

Especially strong or weak environmental currents may induce undesirable movement of device, for example spiraling, and added ballasting adjustment, or fins 114b help prevent this. Preferably in these embodiments, the controller 110 is connected to the power source 120, the drive system 106, and the lift control system 116 if present. Preferably, in these embodiments the lift assist system 114 is adjustable and interconnected to at least one of the controller 110 or lift control system 116, enabling the control of all aspects of AMP device movement, trim, and power generation. During profiling in both up and down directions, the device may need to adjust the lift assist system (i.e. align with or tack against the current). An adjustable lift assist system 114 may make one or more adjustments to take advantage of the current. In some embodiments, the one or more adjustments are directed or controlled by the controller 110. Generator embodiments of the present invention would greatly extend their duration and mission times over currently known devices and systems.

The compromise between adding battery capacity and the added drag due to the associated increase in instrument size is a necessary consideration. Various embodiments likewise utilize a controller 110 that is designed to reduce the energy consumption of taking measurements. For those deployments that require a real-time data telemetry capability, significant energy savings can be achieved with data compression as smaller files means less energy is needed for the transmissions. Existing profilers employ a controller which is not powerful enough to provide data compression of acquired measurement data. In one embodiment, the AMP device utilizes a Linux controller. Specifically, the inventive device employs a compound processor system which comprises a low-power microcontroller mated with a Linux controller, providing significantly more capability than the microprocessors used in existing profilers and with equal or less power consumption. Modems, antennas, radios, and other telemetry devices may be employed in conjunction with the sensors to transmit data from the AMP to an external source. In some embodiments, the telemetry mechanism uses Iridium communication technology to transfer data from the device. The telemetry mechanism may also employ acoustic communication via an acoustic modem/transducer.

A low-power microcontroller is interfaced to the external sensors 104 that are configured to either export data at a specified rate or respond to requests for a scan of data. Data collected will be time-stamped and temporarily stored in a buffer made up of one or more FRAM chips. At predetermined or regular interval, the controller 110, which is a Linux controller, will wake up, extract, and archive the sensor data (while new data is acquired to a second buffer) and perform whatever other instrument control functions that are required before returning to low-power sleep mode. The microcontroller will have provision for multiple digital and analog sensor inputs. Time-stamping the sensor data greatly simplifies the processing of the data in comparison to the process of logging conductivity/temperature/depth (CTD), acoustic current meter (ACM), and engineering plus analog sensor data in separate files with no common reference variable to align the CTD and ACM scans (an ad hoc scheme referencing the start and stop transients of each profile is used to data) as done in previous profiling systems.

In one embodiment, the Linux controller is essentially a break out board (baseboard) for the Technologic Systems TS-4200. The TS-4200 is a high performance low power 400 MHz Atmel AT91SAM9G20 ARM9 with 64 MB or 128 MB RAM. The baseboard takes in a nominal 12V supply and produces 5V and 3.3V at better than 90% efficiency. The base board optionally brings out 10/100 Ethernet and USB as well as five RS232 serial ports each with 12V or 5V switching capability. The system will support two more ports that will provide console connection (operator interface) and communications to the supervisor chip. The supervisor uses a Real Time Clock (RTC) to make decisions about when to wake the Linux system. The supervisor also has two logic level or RS232 comm ports used to communicate to the CTD and drive motor board. The motor board also has a low power microchip that is off or in very low power state most of the time. As noted above, two 1 Mbit FRAM chips may be used as a ping pong buffer for real time data buffering. The motor board has a motor driver to control the profiler drive wheel in both directions and with PWM (pulse width modulation). The motor board also has 4 channels of 16 bit ADC or 2 differential channels. The motor board supports an additional 4 serial ports at Logic or RS232 levels by utilizing Quad SPI UART chip. These 4 ports have hardware flow control capabilities and also support switching 12V power to each port. It is important to note that these 4 ports are available via SPI bus to the main supervisor not the motor board micro. The motor board micro is tasked with all motor functionality, voltage and current status, transceiver switching, port power switching and the 16 bit ADC measurements. The motor board will measure voltage and current for the motor and sensor loads separately.

Equally important in many ways to the goal of increasing profiling reliability is the goal of increasing profiling endurance. In one embodiment, profiling reliability is addressed by first reorienting the drive assembly and guide wheels (as compared to the prior art) to fore-aft orientation with the drive wheel on the upstream side of the mooring mechanism. As the horizontal drag forces on the profiler increases with the strength of the incident horizontal ocean currents, this increases the pressure of the drive wheel on the wire and increases traction (ocean current drag forces on the existing profiler's athwartship-oriented motor causes the wire to ride up one cheek of the drive wheel, which reduces traction and profiling reliability). The AMP device employs a subsystem (operated by the main instrument controller 110) to increase drive wheel 106d tension on the mooring mechanism 122 by, for example, pulling harder on a tension spring 112d, if it is judged that more traction is required. Other embodiments utilize two drive wheels (both upstream of the wire) and one guide sheave for this purpose of increasing traction. While this method will use more energy than the present one motor, the energy drain will not be doubled, and it will certainly enhance profiling reliability.

An instrument control program is designed to run the AMP device which allows users to select which sensors to operate on each measurement cycle. This is particularly advantageous over previous models in which all of the sensors configured for a given deployment are operated on every measurement cycle, consuming substantially more power than necessary. The flexibility in sensor operation allows for long-term deployments of high energy consumption sensors by running the sensors on a subset of measurement cycles or only over selected depth ranges. Use of a more capable central controller additionally allows the device to acquire and log more diagnostic information about the system performance than was previously possible. Specifically, rather than make motor electrical current and battery measurements at several second intervals, quantities such as motor current as well as record peak values can be oversampled and averaged. In addition, the drive system 106 and guide wheels 112b may be instrumented to track their rotation to assess wheel slipping. This information may be fed back to the active system controlling drive wheel tension on the mooring mechanism 122 to increase efficiency.

But, more drive wheel tension against the mooring mechanism to increase traction will likely incur greater motor energy drain. Thus, another approach in the endurance area is streamlining to reduce drag. The longitudinal vessel body design of the inventive device targets this concept, as do design efforts to reduce the cross-sectional area of the profiler, including using smaller-diameter buoyancy spheres 124, than those in existing profiler models, and/or using syntactic foam and possibly containers of buoyant compressible fluid as mentioned above. While buoyancy compensation is accomplished by the buoyancy sphere(s) 124, buoyancy may be managed by any other shape of a suitable volume to be housed in the device. Many embodiments of the present invention utilize a sphere as testing has shown this model to meet several necessary criteria including suitable volume, device buoyancy requirement, and cost/ease to manufacture. The buoyancy sphere may be comprised a material such as glass, ceramic, plastic (e.g., thermoplastic), foam, aluminum, titanium, and any other material as known in the art for buoyant properties or creating buoyancy. While two buoyancy spheres 124, are shown in the figures, in some embodiments, the device buoyancy can be managed by one sphere 124 or multiple (e.g., more than 2, 3, 4, 5, 6, or more) spheres 124, to allow the device to have a substantially neutral weight in the water column.

In previous models, the buoyancy spheres 124, served also as electronics housings. While some embodiments of the present invention can be modified to house the electronic components within the buoyancy spheres 124, the improved AMP design typically uses a separate electronics housing 108 to protect the electronic components from water damage. Doing so substantially improved the design as the electronics housing 108 is now easier to service by the operator, and the migration of the electronics to the aft end of the vessel body 102 balances the internal components for optimal articulating movements. Even in cases where the cross-sectional area of the AMP device is larger than existing profilers, this does not necessarily result in greater total energy use as a result of the balanced design. Additionally, relocation of the electronics to the electronics housing 108 has also increased internal space which was previously unavailable due to additional wiring and connections with the spheres.

To ameliorate ballasting errors, an active system to jettison small weights heavy and/or buoyant pellets can be employed to trim instrument buoyancy after deployment (and possibly periodically during a mission). To even out buoyancy forces during profiles, use of a buoyant, highly-compressible fluid in a deformable container may be used, which can be housed within buoyancy spheres 124. The volume change with pressure helps compensate the buoyancy forces that develop as the vehicle moves through the ocean's in situ density stratification. The vehicle body design to extract lift from the incident horizontal currents to assist the drive motor(s) is described more below. A robust mechanical design that is able to withstand and perform in the face of significant mooring mechanism strumming is used to further enhance the reliability of the device.

Another feature of certain embodiments of the present invention includes a system which allows the profiling vehicle to detect physical stops on the mooring mechanism which may be placed to prevent the vehicle from running into the mooring mechanism terminations and becoming stuck. Existing profilers check their measured pressure against pre-programmed limits and change in pressure over time (dP/dt). In cases where a mooring happens to be deployed at a depth different from the design (or ocean currents cause blowdown of the mooring), it is possible for the profiler to impact the wire stops on each profile and grind its drive wheel until the system terminates the profile based on when dP/dt equals zero. This grinding wastes energy and can polish the drive wheel, causing reduced traction over time. In some embodiments, a magnetic or optical detector and/or a system monitors the guide sheave turning rate as a complementary wire stop detection method to dP/dt equals zero.

The improved AMP device enhances the user interface to reduce problematic deployments caused by operator error. A braking system is employed to hold the position of the AMP on the mooring mechanism between profiling operations. As noted earlier, the braking system of the existing profilers allows slow drift of these vehicles along the wire. One approach is a lock on the driveshaft of the motor(s). This approach, housed inside the motor pressure case, relies on the magnetic coupler to lock the drive wheel and in turn, brake the vehicle. Another method uses a device to physically clamp the mooring mechanism. Such a device provides additional insurance against vehicle loss in the event the mooring mechanism breaks between stops on the wire. In some embodiments, the braking system is capable of decelerating, stopping, and/or holding the device at a selected location in between profiles (e.g., programmed vertical route).

Example 1

The drag of the AMP was estimated and compared to estimates of the drag of the McLane Moored Profiler ("MMP") from the prior art. The drags were estimated for a state with 30 cm/s current while the profiler is traveling along the mooring mechanism at 30 cm/s. Much of the drag of the MMP and most of the drag of the AMP is from the bluff cable guides, guide wheels, drive motor, CTD, and acoustic current sensor. When there is zero current, these bluff bodies are in line, and the downstream bodies are in the wakes of the upstream bodies, reducing drag. When the current is 30 cm/s, each bluff body is in fresh flow and does not benefit from wake shading.

The total MMP drag is estimated to be 8.6 N of which 6.1 N is in the direction of profiler movement. The MMP body drag is estimated to be 3.8 N. The AMP as described herein used a low-drag body in the longitudinal vessel body 102, which is streamlined and pointed into the flow, keeping the boundary layer attached. The bare body is estimated to have a drag of 0.2 N. The bluff bodies of the cable guides, guide wheels, and motor are estimated to have the same high drag as on the MMP. The term "bluff" is used here in the nautical context to mean having a full, blunt form. The truck plate of the AMP is bluff and adds drag over that used by the MMP design, but the acoustic current sensor and CTD sensor can be aligned into the relative flow reducing their drag. For this reason, the total AMP drag under these conditions is estimated to be 3.5 N in the direction of profiler travel. The body drag has been significantly reduced, but the bluff body drag is basically the same. In the past, it has been noticed that streamlining the cable guides, guide wheels, and drive wheel 106*d* in a shroud can result in fouling from filamentous material in the ocean (often fishing line). However, additional research and improvements to reduce the drag further while providing fouling resistance of the truck may be performed.

The AMP was designed about a 30 cm/s current while the profiler is moving 30 cm/s on the mooring mechanism. The wing area of 0.387 $m^2$ was designed to lift four times the drag, further enhancing the streamlined feature of the AMP, corresponding to the peak observed motor current of 250 mA. The wing has a National Advisory Committee for Aeronautics (NACA) 0018 foil design and with a 6 degree angle of attack at the relative flow of 42 cm/s should give a lift of 21.3 N. This thick foil was chosen for strength, effective lift in both directions, and tolerance of twice this angle of attack before stalling. This factor of four was chosen to tolerate significant mooring mechanism angle from vertical, when the lift vector is a large angle away from the cable and profiling direction.

Figure 11A:
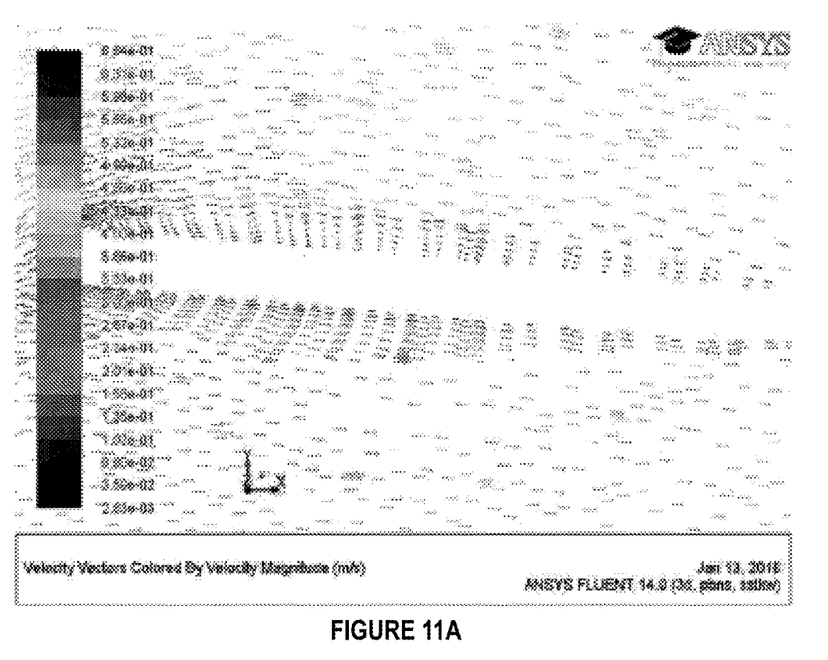
FIG. 11A illustrates the flow model of the existing fin.
Figure 11B:
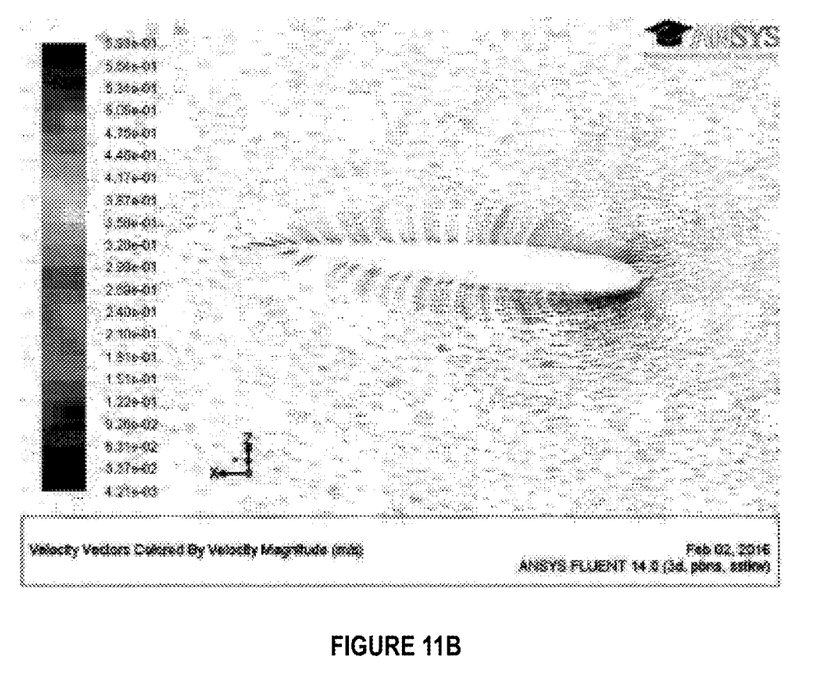
FIG. 11B illustrates the flow model of the streamlined fin design.

Additional modeling is being performed of the flow over the profiler using Fluent. The original design for the tail fins, using a shape that was convenient to machine, stalled at 5 degrees angle of attack, FIG. 11A. By changing the fin shape, to the more involved to machine NACA 0012 foil, the stalling at 5 degrees angle of attack can be avoided, FIG. 11B.

The proposed AMP device will be well-suited to support at least two general areas of ocean observing in future. The first is ocean time series stations: long-term observations of water properties and currents at a fixed geographic site. Greater endurance and improved reliability of the AMP relative to current technology can only benefit these measurement programs. The second class of study focuses on ocean fine structure—those processes that have direct relationships to turbulent mixing. One such process is the breaking of internal lee waves: motions that are generated when sub-inertial flows encounter bathymetric features such as ridges and seamounts. Being specifically designed to function better in strong ocean flows than the current technology, the AMP will be a natural tool to investigate lee wave generation and breaking.

One deployment mission of the AMP device has been drafted to carry out the proposed instrument testing and development. The mission timeline is built around a proposed 6-month trial deployment of the AMP at Line W mooring site #5: 38° 5' N, 68° 41' W in 4,100 m water depth. This site periodically experiences upper ocean currents well in excess of 1 m/s associated with northward meanders of the Gulf Stream and associated Warm Core Rings, which has been considered unsuitable conditions for the MMP, and as such will present an opportunity for operation of the AMP. The mooring consists of a 4,000-m run of mooring mechanism with current meters and temperature/conductivity sensors fixed on the mooring at the top and bottom of this line. A syntactic sphere at the top will be the primary buoyancy element, while an array of glass balls placed just above the acoustic releases will be the backup buoyancy. The site is approximately 240 nautical mi from Woods Hole, Mass. The AMP will return at least ocean temperature, salinity (conductivity) and velocity profile data spanning nearly the full length of the 4,100 m water column. In addition, time series temperature, salinity and velocity data from fixed-depth sensors on the mooring will also be acquired.

Example 2

Figure 1:
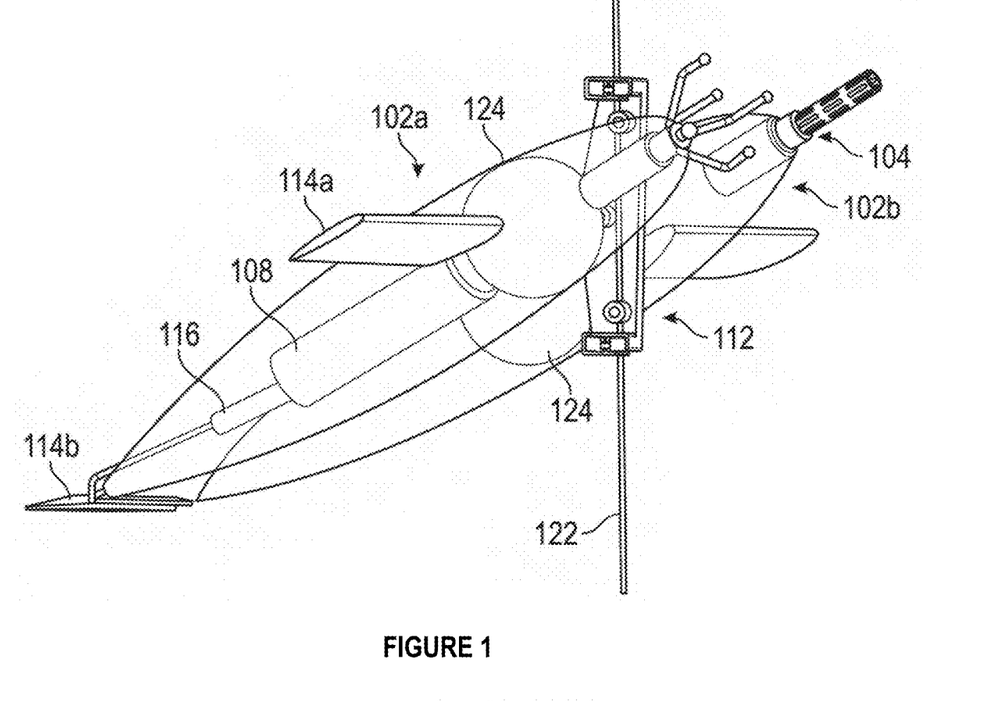
FIG. 1 depicts a side view of one illustrated embodiment of the articulated moored profiler moving about a mooring mechanism (a cable, wire, or other tension member) in a strong ocean current. In this embodiment, two slim, streamlined bodies are arrayed on either side of the propulsion core (including the drive motor and guide sheaves mounted in a dedicated structure) with the Conductivity/Temperature/Depth (CTD) sensor in one body and a modified modular acoustic velocity sensor (MAVS)/acoustic current meter (ACM) in the other. The MAVS transducer arrangement is optimized to sense flow directed into the sensor. An adjustable tail fin orients the body relative to the incident three-dimensional relative flow such that the wings derive lift from the ocean current past the mooring.
Figure 2:
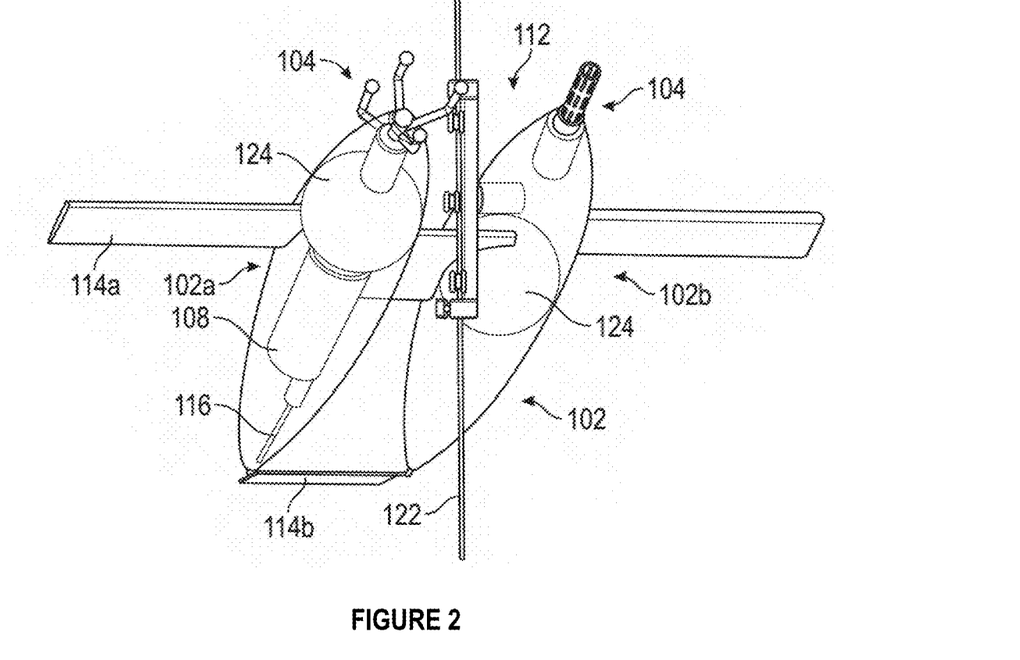
FIG. 2 depicts an up looking view of an illustrated embodiment of the present invention disposed on a mooring mechanism.

As depicted in FIGS. 1 and 2, this embodiment of the inventive device employs two vessel bodies 102*a* and 102*b* coupled together spatially separated by a connection near the middle sections of the bodies 102*a* and 102*b*. This connection is capable of providing electrical signals, power, data communication, etc. between the two vessel bodies 102*a* and 102*b* or may only provide a mechanical engagement between the two bodies. The mooring mechanism 122 is typically disposed between the two bodies and engaged with the attachment mechanism 112.

Vessel body 102*a* is adapted to incorporate the electronics housing 108 and the lift control system 116 within the internal space. As shown, the buoyancy sphere within vessel body 102*a* is shifted forward relative to buoyancy sphere in vessel body 102*b* to compensate for the difference in weight distribution. The position of the buoyancy spheres 124, needs to account both for the overall buoyancy/weight and fore-aft balance about the pivoting point of the articulating mechanism 118. Each vessel body may comprise one or more sensors 104 which each retain their sample measurements and data within their respective vessel bodies or more transfer all data to the electronics in the electronics housing 108. Vessel body 102*a* as shown comprises a sensor such as a MAVS sensor. Vessel body 102*b* as shown comprises a sensor such as a CTD sensor (e.g., Seabird Electronics 52MP CTD).

Example 3

AMP Specifications

The following table lists specification for one embodiment of the present invention. While the materials listed are suitable, other materials of similar properties may be used. For example, many structural components are comprised of ultra-high molecular weight (UHMW) polyethylene but may be substituted for a material with similar properties including high abrasion resistance, high melt viscosity, low coefficient of friction, chemical resistance, load-bearing strength, and impact strength.

TABLE 1

| | | |
|---|---|---|
| Dimensions | Length | 85.0 in |
| | Width | 17 in |
| Sensor Array | Sensors | CTD Sensor |
| | | MAVS Sensor |
| Drag (at 1080 cm/s current) | Total Device Drag | 3.5N |
| | Vessel Body Drag | 0.2N |
| Profiling Speed | Up/Down | 25 cm/s-35 cm/s |
| Depth Rating | Typical Use | 6,500 m |
| Materials | Shell | ⅛" Polyethylene |
| | Electronics Housing | Titanium |
| | Vertical Plate | 1" UHMW Polyethylene |
| | Horizontal Plate | 1" UHMW Polyethylene |
| | Truck Plate | 1" UHMW Polyethylene |
| | Idler Arm Support | 1" UHMW Polyethylene |
| | Idler Arm Tab | ¼" UHMW Polyethylene |
| | Drive Engine | Ertalyte ® |
| | Drive Wheel | Ertalyte ® |
| | Fasteners for Tension Spring | Type 316 Stainless Steel |
| Buoyancy | Buoyancy Sphere | 2-12" glass spheres |
| Lift Assist System | Wing Set (2 wings) | NACA 0018 foil profile |
| | | 6 degree angle of attack |
| | | 0.387 m² wing area |
| | | Lift force 21.3N |
| | Fin Set (4 fins) | NACA 0012 foil profile |
| | | 6 degree angle of attack |
| Strong Current Use | Current Speed | At least 1 m/s |
| Profiling Endurance | Travel Distance | 2 million meters |

Example 4

This example further describes one embodiment of the AMP device illustrated in FIG. 4. The device comprises a vessel body 102 with an internal hollow space adapted to secure multiple components, particularly mechanical and electrical components, such as electrical housing 108, the sensor array 104, and the drive motor assembly 106. Disposed within the vessel body 102 is the internal frame which in this case is a vertical plate 126 which mounts the electrical housing 108, buoyancy spheres 124, and the lift control system 116 in place. Vertical plate 126 is securely attached within the vessel body 102 and further secured by a tail cone to which part (fin set 114b) of the lift assist system 114 is mounted. A wing set 114a is mounted closer to the leading end of the body 102, operationally coupled with the articulating mechanism 118. Wing set 114a is substantially symmetrical and comprises an angle of attack less than 10 degrees relative to the current flow. Fin set 114b, in this case, comprises four fins wherein the top and bottom fins may be specifically angled by a few degrees (e.g., less than 10 degrees) to compensate for the off-center attachment to the mooring mechanism 122. Lateral fins of fin set 114b are mechanically engaged with the lift control system 116 which provides an adjustable "elevator" mechanism to set the desired angle of attack and reduces drag on the vessel body 102. The device is attached to a mooring mechanism 122 wherein the cable passes through the cable guides 112c and retains physical contact with the guide wheels 112b secured on the truck plate 112a.

In its low drag configuration, the device is able to utilize the lift assist system 114 to rapidly climb up and down the mooring mechanism 122 to complement the propelling force of the drive system 106 to reliably extend the profiling endurance to about 2 million meters. Additional embodiments of this device may allow the lift assist system 114 to provide 50%, 75%, 90%, 95%, and even up to 100% of the propelling force in presence of strong water currents. The device is adapted to profile in strong currents which are 25 cm/s or great, up to 1 m/s, and up to 2 m/s.

For the purpose of understanding the Articulating Moored Profiler System, references are made in the text to exemplary embodiments of an Articulating Moored Profiler System with various components that may be employed with such a system, only some of which are described herein. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

Moreover, the terms "substantially" or "approximately" as used herein may be applied to modify any quantitative representation that could permissibly vary without resulting in a change to the basic function to which it is related.

What is claimed:

1. A submerged profiling device, comprising:
   a vessel body comprising a leading end opposing a tail section;
   a rechargeable battery;
   an articulating mechanism connected to said vessel body and adapted to align said vessel body relative to a water current flow;
   an attachment mechanism engaged with said articulating mechanism and adapted to mount onto a mooring mechanism; and
   a drive system having a drive motor, wherein said drive system is configured to generate electricity to recharge the rechargeable battery.

2. The device of claim 1 further comprising a sensor array comprising one or more sensors adapted to measure at least one parameter, said sensor array being integrated onto or within said vessel body.

3. The device of claim 1 further comprising a lift assist system comprising one or more of a wing set, and a fin set; wherein said lift assist system is adapted to increase or decrease the force of the water current flow impacting said lift system, generating a lift force.

4. The device of claim 3, wherein said lift assist system is further adjustable, and configured to make one or more adjustments to increase or decrease the amount of the generated lift force.

5. The device of claim 4 further comprising a controller in communication with at least one of said lift assist system, said sensor array, and articulating mechanism.

6. The device of claim 5, wherein said controller is configured to control said one or more adjustments.

7. The device of claim 4, wherein said lift assist system provides up to 100% of the lift force.

8. The device of claim 4, wherein said lift force is not supplied by the driving system using the rechargeable battery.

9. The device of claim 1, wherein said motor can generate a back electromotive force.

10. The device of claim 9, wherein said back electromotive force is about 11.5 volts at a device profile speed of 25 cm/s.

11. The device of claim 9, wherein when said device is driven by environmental energy to 1 m/s said back emf increases to approximately 46 volts.

12. A method of vertically profiling in an aqueous environment, comprising the steps of:
   (a) providing a device comprising a vessel body, a rechargeable battery disposed within said vessel body, an articulating mechanism connected to said vessel body, an attachment mechanism engaged with said articulating mechanism; an adjustable lift assist system configured to make one or more adjustments to increase or decrease the amount of a generated lift force from the water current flow impacting said lift assist system; a controller in communication with said lift assist system and configured to control said one or more adjustments, and a drive system having a drive motor, wherein said drive system is configured to generate electricity to recharge the rechargeable battery;

(b) mounting said attachment mechanism onto a mooring mechanism disposed in an aqueous environment, wherein said articulating mechanism is adapted to align said device relative to a water current flow; and (c) moving said device along said mooring mechanism.

13. The method of claim 12 wherein said device further comprises a sensor array comprising one or more sensors adapted to measure at least one parameter, said sensor array being integrated onto or within said vessel body, and further comprising the step of (d) operating said sensor array during at least one of steps (b) and (c).

14. The method of claim 12 wherein said moving step is performed so that the generated lift force is used to move said device along said mooring mechanism.

15. The method of claim 14 wherein said moving step (c) further comprises directing said controller to make said one or more adjustments thereby changing the speed of said movement of said device along said mooring mechanism.

16. The method of claim 14, wherein said lift assist system provides up to 100% of the lift force.

17. The method of claim 14, wherein said lift force is not supplied by the driving system using the rechargeable battery.

18. The method of claim 12 wherein said moving step is performed so that said drive system is used to move said device along said mooring mechanism.

19. The method of claim 12, further comprising the step of generating electricity to recharge the rechargeable battery.

* * * * *